Figure 1:
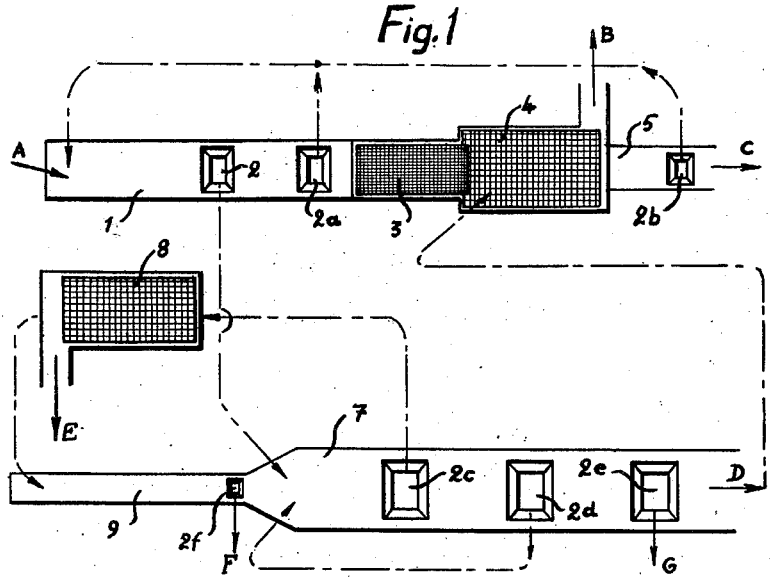

July 10, 1951 — A. FRANCE — 2,560,429
APPARATUS FOR THE WASHING IN BULK OF PARTICLES OF
COAL AND ORES BY ALLUVIATION IN WASHING CHUTES
Filed June 26, 1946

INVENTOR.
ANTOINE FRANCE (DECEASED)
ADOLPHE DETIENNE, ADMINISTRATOR
BY:
Haseltine, Lake & Co.
AGENTS Patented July 10, 1951

2,560,429

UNITED STATES PATENT OFFICE 2,560,429

APPARATUS FOR THE WASHING IN BULK OF PARTICLES OF COAL AND ORES BY ALLUVIATION IN WASHING CHUTES

Antoine France, deceased, late of Liege, Belgium, by Adolphe Detienne, executor, Liege, Belgium, assignor to Rheo-France Compagnie Internationale des Rheolaveurs A. France, Societe Anonyme, Liege, Belgium, a company of Belgium Application June 26, 1946, Serial No. 679,416
In Belgium August 18, 1944

Section 1, Public Law 690, August 8, 1946
Patent expires August 18, 1964

1 Claim. (Cl. 209—44)

This invention relates to a plant and process for the washing and re-washing in bulk of particles for the purification of coals and ores by alluviation in washing chutes and has reference to plants in which the materials to be separated are subjected to the action of flowing liquid streams.

For the washing of particles usually the inclinations, lengths and especially the widths of the washing chutes depend on the nature of the materials to be purified, the tonnages per hour to be dealt with and the maximum size of the largest particles and devices for the extraction of dense materials are arranged on these alluviation chutes.

The various sizes of the particles of the materials to be purified often present such natural characteristics that, in order to comply with the requirements of industry or commerce, separate washing of the different categories of particles becomes desirable.

According to known practice in these cases, there are employed several alluviation chutes or washing plants, usually two, for the separate purification of the various sizes of particles of coal.

It is also known that, after the washing in bulk of the particles included within somewhat wide dimension limits, all the size categories are not always equally well purified.

In plants for washing by alluviation which provide for separate purification of the various categories of particles and especially in the case of small tonnages per hour to be treated, it often happens that the width of the chutes depend not on the quantities of materials to be treated or on their nature, but solely upon the maximum size of the particles to be treated in said chutes.

It is well known that, in order to avoid fouling of the bed or stoppages in the moving of the material to be treated, the width of the chutes has to be at least a fixed multiple of the maximum size of the coal dealt with and as a result there are expensive plants with wide washing chutes and norias of an hourly capacity disproportionate to the tonnages to be dealt with.

The consumption of water per ton of ore treated is, in plants for washing by alluviation, a function of the width of the necessary chutes for alluviation.

It thus occurs that the washing installations consume outputs of water and therefore power which is no longer in reasonable relation to the quantity of material to be purified.

In the present invention the procedure and the arrangement of the washing chutes are such that the various sizes of particles are purified according to requirements in chutes for washing by alluviation, the widths of which no longer depend solely upon the maximum size of the particles to be dealt with.

Figure 2:
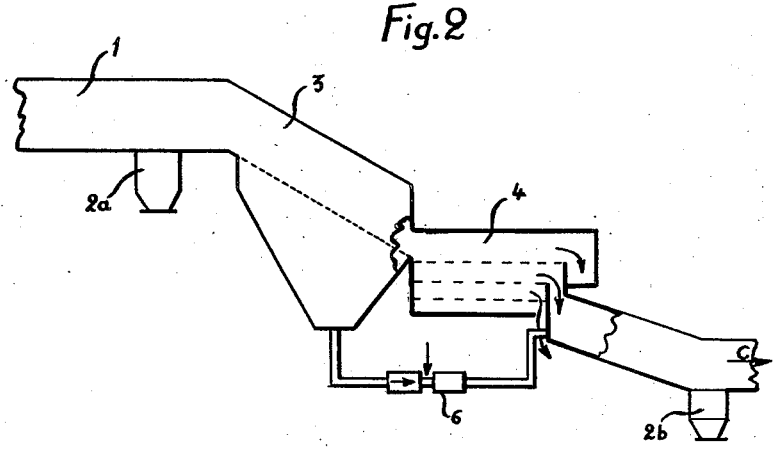

In the accompanying drawing:

Figure 1 is a plan view showing the general arrangement of one form of the washing plant; and Figure 2 is a fragmentary elevation of part of the washing plant shown in Figure 1.

As shown in the figures the material to be treated, which may be, for instance, a raw coal or run of mine cleared of its small particles, is fed at A at the top of a first washing chute 1 there to be treated by alluviation under the influence of flowing liquid streams. This chute 1 is of a suitable width depending on the maximum diameter of the particles to be treated and of the tonnages to be purified, said chute being provided with two devices 2 and 2a for the extraction of dense products.

The raw coal, cleared of its dense materials, then passes on to a grid 3 with bars or a wire gauze or wire screen where it loses part of its driving and washing liquid before being conducted on to a grid 4 for the regrading of the washed coal.

The reclassifying screen 4 separates the washed coal into two or several categories or sizes which, according to the requirements of commerce or industry or according to the natural characteristics of the coals dealt with, are delivered as commercial products at B or are in part directed to the top of a second washing chute 5 fitted with an extractor device 2b.

The washing chute 5 normally treats again the particles of the smallest diameters and is of a width suitable for the diameters and for the tonnage of the particles to be treated again and the extractor device 2b situated on this chute rectifies the quality of the commercial product correspondingly obtained at the lower end of the washing chute 1, the purified product of this chute being delivered at C.

The flowing liquid stream for the conveyance of the material in the washing chute 5 is regulated by a cock 6 situated in the piping which connects the top of this chute 5 with the reception hopper for the liquid arranged on the grid 3, as shown in Figure 2.

In these two washing chutes the products from the devices 2a and 2b for the evacuation of dense materials are raised to the top of the washing chute 1 for the purpose of rewashings.

The dense materials extracted from the washing chute 1 by the evacuating device 2 are raised to the top of a rewashing chute 7 also of a width suitable to the maximum diameter of the material to be re-washed and to the tonnage per hour raised to the top of this chute and fitted with three devices 2c, 2d and 2e for the extraction of dense materials. The light product recovered at the lower end D of the washing chute 7 being directed towards the top of the reclassifying screen 4 with a view to its regrading with the light products of the washing chute 1.

The extractor device 2c eliminates the dense materials which are raised to the top of a regrading sieve 8 and separates them into two categories of particle sizes, the large particles being finally delivered from the plant at E whilst the small particles are conducted to the head of a second re-washing chute 9 fitted with a single device 2f for the extraction of dense materials.

The re-washing chute 9 also of a width suited to the diameter and to the tonnage per hour of the particles to be treated again refines the dense products of these diameters, said dense products being finally delivered from the washing plant at F through the evacuator device 2f.

The evacuator device 2d is connected to a raising device which reconducts the product of the re-washing to the head of the chute 7 and the evacuator device 2e delivers the mixed products eventually included in the coal at G of the washing plant.

Such an arrangement of the washing plant presents various new ideas as compared with the known plants for washing by alluviation.

In known plants for washing by alluviation dealing with particles of coal separately according to their diameters, use is sometimes made, for the treatment of large particles, of chutes for washing by alluviation of excessive widths for the frequently small tonnages per hour for purification.

In this invention however, the wide chutes 1 and 7 have to treat together large and small particles and the hourly tonnages feeding these chutes in this way fully justify widths of chutes suitable for the treatment of the largest particles of the coal for purification; further the consumption of washing water or separator liquid and the subsequent power indispensable for the pumping of this water are thus limited to the requirements of a single wide washing chute instead of those which would be required for a wide chute and a narrow chute.

This also applies to the dimensions of the noria buckets for example, which to a certain extent have to take into account the size of the particles to be raised.

Again, in known plants for washing by alluviation dealing with coal particles separately according to their diameters, the washing of the large particles and especially the re-washing of the large dense particles is carried out without the influence of small particles of shale, the favourable effect of which on the alluviation of large particles is well known.

In this invention however, the small dense particles accompany the large particles in the washing chutes, especially during the re-washing operation, since with this latter chute for alluviation with suitable regulation of the evacuator device 2f it is possible to bring back at will to the top of the re-washing chute 7 the small dense particles required for a perfect separation from the largest particles of great density.

The utilization of the alluviation chutes 5 and 9 renders entirely independent the treatment of the two categories of particles.

What is claimed is:

A launder washer for the washing in bulk of particles of coal and ores by alluviation in washing chutes equipped with evacuators for the discharge of dense particles which comprises, in combination: four chutes associated in two series of two successive chutes in horizontal arrangement, each chute having a width in accordance with the greatest size and with the horary tonnage of particles to be treated therein, the first chute of the first series being equipped with two evacuators while the second one of the same is equipped only with one evacuator, the first chute of the second series being equipped with one evacuator while the second one of the same is equipped with three evacuators, said second chute of the second series being adapted to receive ahead the material delivered at the lower end of the first chute of the same, means to supply with material to be treated and with washing liquid the first chute of the first series ahead thereof, a strainer arranged at the lower end of said first chute of the first series to receive the material delivered at said end and to separate the particles from the washing liquid, a sieve adapted to receive the particles retained by said strainer and to supply with the small graded particles the second chute of the first series ahead of the same, means to collect the washing liquid passing through said strainer, means to feed with said received liquid the second chute of the first series ahead of the same, means to regulate said feeding of liquid, means to convey the particles delivered at the lower end of the second chute of the second series to said sieve, in the first series means to convey particles from the second evacuator of the first chute and from the evacuator of the second chute to the head of the first chute, means to convey particles from the first evacuator of the first chute of the first series to the head of the second chute of the second series, means to convey particles from the second evacuator of the second chute of the second series to the head of the same chute, a screen adapted to receive the particles delivered by the first evacuator of the second chute of the second series and to supply with the fine graded particles the first chute of the second series ahead of the same and means to convey particles from the first evacuator of the second chute of the second series to said screen.

ADOLPHE DETIENNE,
Executor of the Estate of Antoine France, Deceased.

REFERENCES CITED

The following references are of record in the file of this patent:

UNITED STATES PATENTS

| Number | Name | Date |
|---|---|---|
| 1,672,448 | Glouwez | June 5, 1928 |
| 1,897,545 | Bird | Feb. 14, 1933 |

OTHER REFERENCES

Coal Preparation, published 1943, The American Institute of Mining and Metallurgical Engineers New York, pages 354 to 377.